United States Patent [19]

Przybylinski et al.

[11] 4,268,968

[45] May 26, 1981

[54] RAILWAY WHEEL PROFILOMETER AND DIAMETER GAGE

[75] Inventors: Phillip G. Przybylinski, Schererville, Ind.; James J. Schuller, Crete, Ill.; Eugene I. Varda, Saint John, Ind.

[73] Assignee: Pullman Incorporated, Chicago, Ill.

[21] Appl. No.: 68,120

[22] Filed: Aug. 20, 1979

[51] Int. Cl.³ .......................... G01B 5/20; G01B 5/08
[52] U.S. Cl. .............................. 33/174 P; 33/178 D; 33/203.11; 33/DIG. 1
[58] Field of Search ............. 33/174 L, 174 P, 178 R, 33/178 D, DIG. 1, 203, 203.11, 203.18

[56] References Cited

U.S. PATENT DOCUMENTS

| | | | |
|---|---|---|---|
| 340,883 | 4/1886 | Kells | 33/203.18 |
| 848,846 | 4/1907 | Patterson | 33/203.11 |
| 2,325,362 | 7/1943 | Black, Sr. | 33/203 |
| 2,672,690 | 3/1954 | Crook | 33/174 P |
| 2,789,354 | 4/1957 | Polidor et al. | 33/174 P |
| 3,315,366 | 4/1967 | Marshall | 33/172 R |
| 3,477,136 | 11/1969 | Johnson | 33/178 R |
| 3,964,303 | 6/1976 | Vexelman et al. | 33/203.19 |
| 4,020,681 | 5/1977 | O'Brien | 33/DIG. 1 |

FOREIGN PATENT DOCUMENTS

| | | | |
|---|---|---|---|
| 15547 | 3/1955 | Fed. Rep. of Germany | 33/178 D |
| 1249866 | 11/1960 | France | 33/203 |
| 1377799 | 9/1964 | France | 33/174 R |
| 151695 | 3/1962 | U.S.S.R. | 33/174 P |

Primary Examiner—Richard R. Stearns
Attorney, Agent, or Firm—Richard J. Myers

[57] ABSTRACT

A railway car wheel profilometer accurately transcribes the profile of the wheel treads onto a removable card for permanent record and later analysis. The device also measures the diameter of the wheel.

13 Claims, 6 Drawing Figures

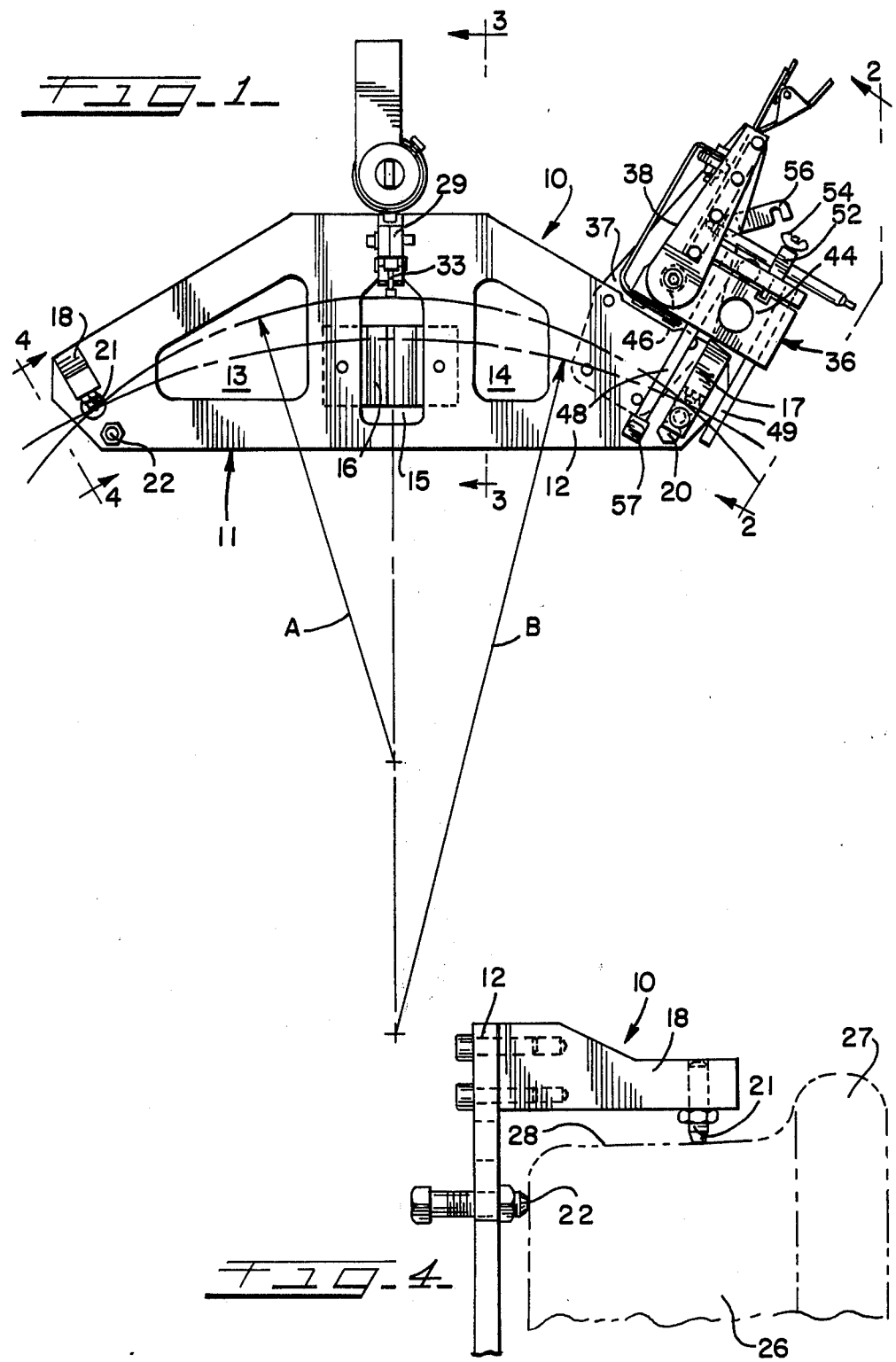

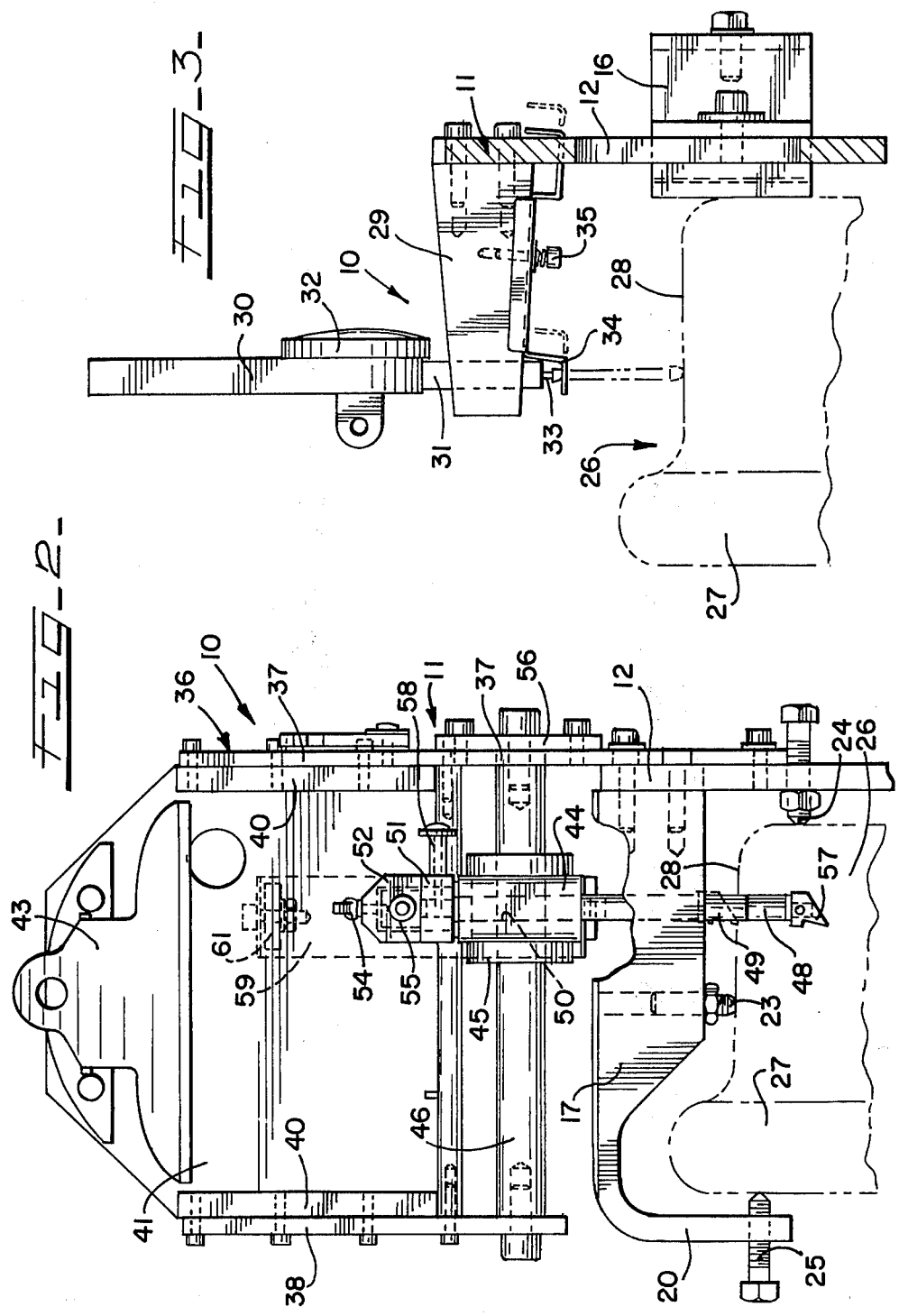

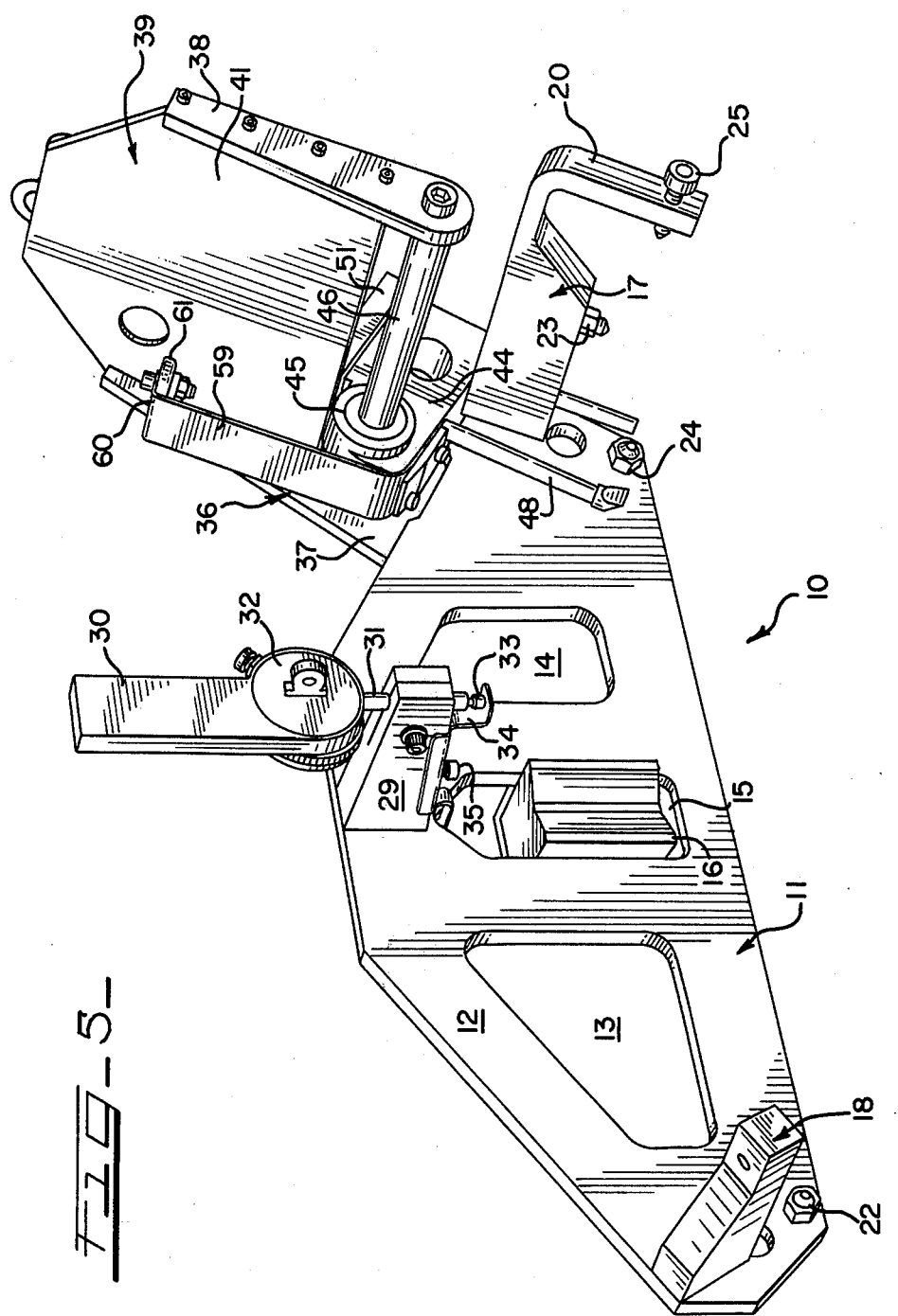

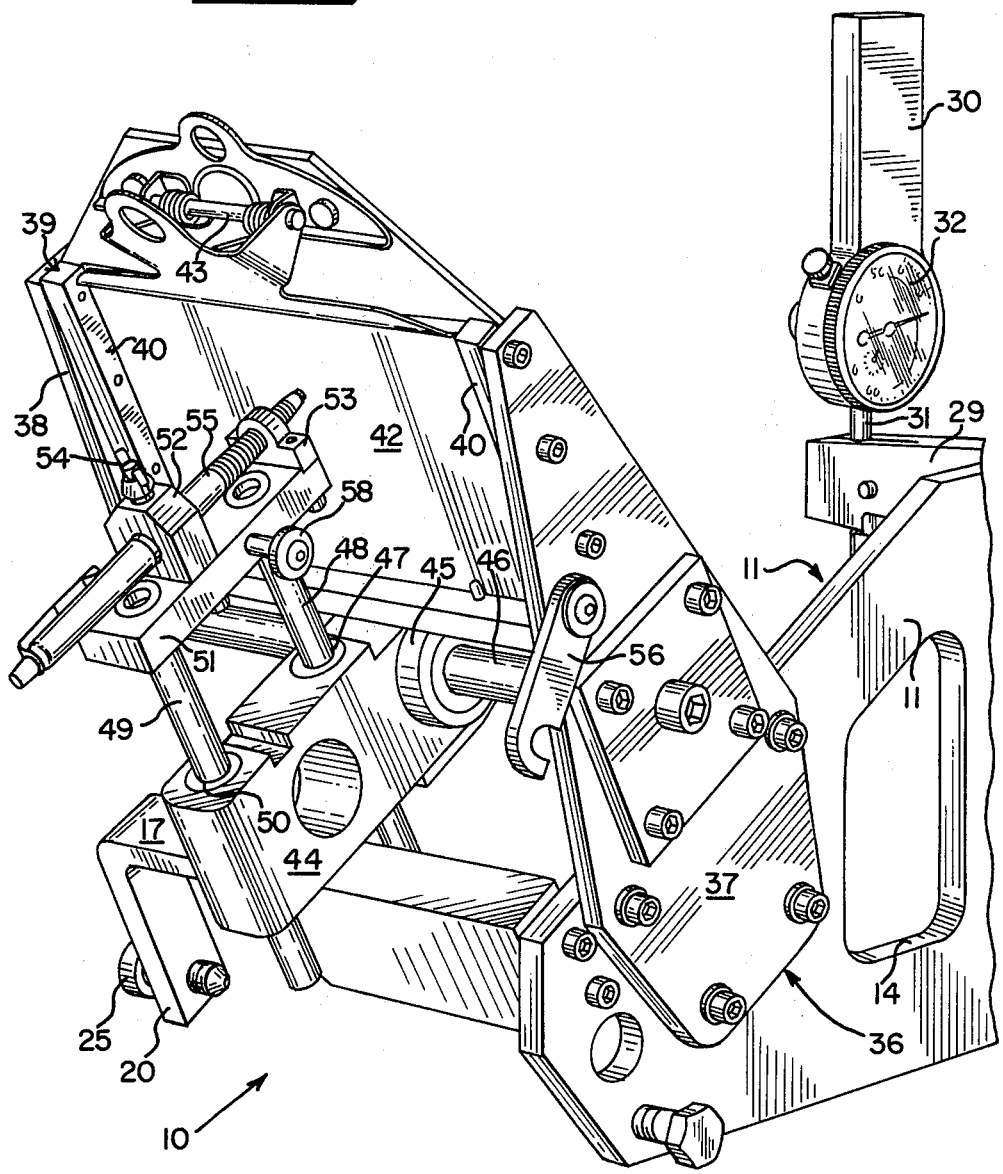
FIG_6

RAILWAY WHEEL PROFILOMETER AND DIAMETER GAGE

BACKGROUND OF THE INVENTION

1. Field of the Invention

The field of invention relates to gaging devices and more specifically the invention relates to a profilometer for measuring and transcribing the contour of the wheel tread of a railway car and for measuring the diameter of the wheel.

2. Description of the Prior Art

Various devices exist in the prior art for gaging wheels of different types such as railway cars and those utilized in automobiles. U.S. Pat. No. 340,883, Apr. 27, 1886 shows a test gage for setting car wheels. In this particular gage the wheels are set precisely from a lateral spacing standpoint. U.S. Pat. No. 2,325,362 is pertinent in that it discloses a gage which is attached to a railway car wheel and which may determine the imperfections which may occur in the tread in a railway car wheel. However, the gage shown in this particular patent does not include the novel features present in the profilometer of this invention. A wear measuring arrangement is disclosed in U.S. Pat. No. 3,964,303, June 22, 1976 where again a gaging device is secured to the wheel itself. The present device, however, is entirely different from that disclosed in this particular reference in that the present invention relates to a profilometer which also provides for transcription of the profile onto a removable card. U.S. Pat. No. 3,315,366 is only pertinent in that it shows a device which is adapted to attach to an automobile type of wheel and will indicate out of round conditions.

SUMMARY OF THE INVENTION

In the present invention a wheel profilometer is provided to accurately transcribe the profile of a railroad car wheel tread onto a removable card for permanent record for later analysis. The device is connected to the wheel using a combination of magnetic and screw clamp attachment. The device includes a main support structure held parallel to the outside rim of the wheel by contact points at opposite ends thereof and by a centrally located magnet which is operable to on-and-off conditions for removably securing the structure parallel to the wheel. The basic profilometer is cantilevered perpendicularly off the main support structure of the device. The support structure includes screw attachment means which assists in fixing the position of the support structure after the device has been properly set on the wheel.

The profilometer portion includes a transversely extending shaft on which a stylus and follower support is slidably mounted by means of a bearing. Thus this support moves laterally across the wheel tread and includes a vertically movable shaft having at its lower end a follower which is adapted to engage and follow the transverse width of the wheel tread of a railway car. A stylus support is connected to the follower shaft and moves laterally with the stylus support. A chart support bracket is connected to the main bracket of the unit and includes a chart supporting surface on which a chart can removably be positioned. The chart records by means of a stylus writer, the contour of the wheel tread which is being explored by the stylus follower as the unit travels laterally across the tread surface. Biasing means are also provided to urge the stylus writer into recording contact with the chart provided for the purpose. The profilometer also includes a gage and means associated therewith for indicating the diameter of the wheel which is being investigated.

BRIEF DESCRIPTION OF THE DRAWINGS

FIG. 1 is a side elevational view of a profilometer and bracket structure in position for being supported on a railway car wheel;

FIG. 2 is a cross-sectional view of a profilometer and recording arrangement taken particularly along line 2—2 of FIG. 1;

FIG. 3 is a cross-sectional view through a bracket support structure and gage arrangement taken along the line 3—3 of FIG. 1;

FIG. 4 is a cross-sectional view taken along the line 4—4 of FIG. 1;

FIG. 5 is a perspective view of one side of the profilometer and supporting bracket structure;

FIG. 6 is another perspective view showing another side of the profilometer.

DESCRIPTION OF THE PREFERRED EMBODIMENT

A profilometer or wheel gaging device 10 comprises a support structure 11 including a vertical plate 12 having a plurality of openings 13, 14 and 15. The opening 15 suitably supports a magnet 16, which is of an on-and-off type, conventional in the art, and which is adapted to secure the entire profilometer and wheel gaging device 10 to the side of a railway car wheel to be investigated insofar as its tread configuration is concerned. The support structure 11 includes at opposite ends thereof connector brackets 17 and 18, the arm 17 including a vertical arm portion 20. Contact points in the form of adjustable locking screws 21, 22, 23 and 24 are provided. The bracket 18 includes the contact point 21 for vertical adjustment and the contact point 22 extends outwardly from one end of the support structure 11. Contact point 23 projects downwardly from the arm 17 and contact point 24 projects outwardly from the plate or support structure 11. A locking screw 25 as best shown in FIG. 2 is adapted to securely lock one end of the profilometer to the ferrous wheel structure 26 disclosed. The wheel 26 comprises a conventional flange 27 and wheel tread 28. In FIG. 1 the letter A indicates a 28" diameter wheel and the letter B indicates 42" diameter wheel.

As best shown in FIG. 1 and 3 a lateral gage support bracket 29 comprises an upright pedestal 30 which includes a tubular spindle 31 on which a dial 32 is positioned. A depth probe 33 slides vertically within the tubular spindle 31 and is adapted to engage the wheel tread 28 as best shown in FIG. 3 in the dotted line after the slide stop 34 is moved to a release position. The slide stop 34 includes a slot (not shown) and a lock nut 35 releasably secures the slot stop in its release and locked positions.

A laterally movable mounted moving means is generally designated by the reference character 36 and includes an upright plate 37 which is rigidly connected to the vertical plate 12 and projects upwardly with respect thereto. An outer plate 38 is connected to a chart support bracket and particularly to one of the flanges 40, the other flange being suitably connected to the plate 37 as best shown in FIG. 2. The chart support bracket 39 includes a chart support surface 41 on which a chart 42 or other recording means may be removably connected. FIG. 6 discloses the chart which is removable and which is held in position by a conventional spring clamp 43 of the type utilized generally in conventional writing boards.

A stylus and follower support bar or bracket member 44 is best shown in FIGS. 2 and 6 and includes a bearing 45 which is supported on a shaft 46 extending between and being supported on the plates 37 and 38. The stylus and follower support bar 44 includes a first vertical bore 47 through which a vertical shaft 48 extends. The shaft 48 as best shown in FIG. 2 is provided at its lower end with a follower 57 which is adapted to engage the wheel tread 28 as the follower support 44 is moved laterally across the wheel tread.

The stylus and follower support 44 also includes a second vertical guide shaft 49 which is vertically movable in a second bore 50 provided in the support 44. A stylus carrier plate 51 is supported on both shafts 48 and 49 for vertical adjustable movements therewith. The carrier plate 51 has provided thereon a bracket 52 and bracket plate 53 projecting upwardly with respect thereto, each of them having suitable aligned openings through which a stylus writing pen 55 is disposed. A clamping screw 54 suitably secures the stylus writing instrument in the position shown in 55 where its forward writing end is firmly supported in a bore in the bracket 53. The stylus writing pen may be of a conventional tip which will transcribe the contour of the wheel tread as desired.

When the unit is not in use, a hinge stop member 56 engages a stop projection 58 to lock the same against transfer movement. As best shown in FIG. 5, a leaf spring 59, is suitably connected at its lower end to the stylus and follower support 44 and includes an upper flange portion 60 having contained thereon a rotor follower 61 which moves across the chart support surface 41 and serves to urge the bracket 44 upwardly at one end in a manner putting biasing pressure on the writing stylus 55.

OPERATION

To utilize the present device, a blank card or chart 42 is inserted and clamped to the chart support surface 41 as best shown in FIG. 6. The profilometer and support structure 11 then is positioned on the wheels squarely, such that all of the contact points are contacting the respective portions of the wheel. The magnet is then turned on for primary attachment of the support structure to the wheel. The secondary clamping screw 25 is then tightened to then further fix the profilometer portion in exact end proper position. The hinge stop 56 is then removed from its engagement with the stop projection 58 and the lower support 44 is now movable laterally. The follower 57 engages the wheel tread 28 and it is moved laterally by the operator to get a true, complete contact scanning of the wheel tread. This same profile or contour is transcribed by means of the stylus writer 55 onto the chart 42 to provide a true recording. After this, the carrier 44 is then again locked in position by the hinge stop 56. The depth probe 33 is now relesed from its engagement with the sliding stop 34 and it drops to the position shown in FIG. 3 in the broken lines, in engagement with surface 28, which then measures the diameter of the wheel involved. The probe is then again placed in its stored position and the secondary screw clamp is unlocked as well as the magnet is turned off and the whole structure and profilometer are removed from the wheel.

It is obvious that the purpose of the subject wheel profilometer is to accurately transcribe the profile of a railroad car's wheel onto a removable card for permanent record and later analysis. Previous designs have not combined the portability which is present in the present device since it can be utilized in the field without de-trucking the cars. Thus it has portability and repeatability and the capacity to accurately retain the relationship of the profile to the axis of the wheel-set axle. Previous devices, while capable of transcribing the profile, either attached to the wheel without a reliable axle-axis reference, or provided the axle reference by means of attachment to both wheels of a wheel set, a method which limits the full usefulness in field measurements. This, of course, is disclosed in the prior art.

The subject profilometer incorporates a definite reference to the wheel-set axis, while retaining maximum portability and providing, in addition, a measurement of the wheel's diameter. This device attaches to the wheel, using a combination of a magnetic and a screw clamp. The main body of the profilometer is held parallel to the outside of the wheel by a set of three contact points, one of which is the magnet. The basic profilometer is cantilevered perpendicularly off the main body of the device. Further, the screw clamp on the profilometer fixes the position of the device after setting the device properly on the wheel. With this arrangement, the bottom of the card becomes a reference which is parallel to the axle axis and thus is an important reference in order to relate the angle of the wheel tread to the physical world. The profile is traced by a stylus related pen transversing a set of perpendicular shafts on linear ball bearings.

The device also measures the diameter of the wheel at the standard reference tape line. This is accomplished by using the dial gage for accuracy to measure the height of a reference chord of the wheel. This dial gage reading can be easily converted by standard geometric relations to the wheel diameter.

A profile taken in the manner above disclosed is transcribed on the card. The distance of the profile from the axle axis (radius) is obtained from the reading of the calibrated dial gage using a graph of dial gage reading versus wheel diameter. This method allows recording both wheels of the wheel-set separately while maintaining their angular and radial relationship to the wheel-set axis. A separate device is used to determine the distance between wheels of a wheel-set. With this measurement the wheel-set profiles can be completely described.

What is claimed is:

1. A profilometer and wheel gaging device for recording the profile of the wheel tread of a vehicle wheel comprising:
   a support structure adapted to be mounted on a single vehicle wheel engaging and positioned by the surface thereof,
   tread follower means adapted to engage the wheel tread of said vehicle wheel,
   a bracket member connected to said support structure,
   mounting means for supporting said follower means on said bracket member for movement of said follower means transversely of said wheel tread whereby said follower means engages and follows the transverse contour of said wheel tread,
   recording means on said bracket member, and stylus means mounted on said mounting means for tracing the transverse contour of said wheel tread on said recording means in response to movement of the follower means following the transverse contour of said wheel tread.

2. The invention in accordance with claim 1,
including gage means supported on said support structure for gaging the diameter of said wheel.

3. The invention in accordance with claim 2,
said gage means including a dial and a vertically movable depth probe adapted to engage the wheel tread.

4. The invention in accordance with claim 1,
said mounting means including biasing means for urging said stylus writer into engagement with said recording means.

5. The invention in accordance with claim 1,
said follower means being mounted on said mounting means for movement at right angles to the axis of rotation of said wheel.

6. The invention in accordance with claim 1, p1 said mounting means including
a shaft connected to said bracket member extending laterally with respect to said wheel tread;
a second bracket member mounted on said shaft for sliding movement thereon, said second bracket member including a bore disposed at a right angle to said shaft, and
a second shaft carried by and slidable within said bore, said tread follower means being connected to the lower portion of said second shaft.

7. The invention in accordance with claim 6,
said second shaft having stylus support means mounted thereon for supporting said stylus means,
and biasing means urging said second bracket member and stylus support means in a direction to urge said stylus means into engagement with said recording means.

8. The invention in accordance with claim 7,
said recording means comprising a chart.

9. The invention in accordance with claim 8,
including an upright chart support bracket connected to said bracket member on which said chart is mounted,
said biasing means incuding a leaf spring connected to said second bracket member engaging one side of said chart support bracket in sliding relation, said stylus means being mounted on said second bracket member on an opposite side of said chart support bracket.

10. The invention in accordance with claim 1,
including connector members on said support structure for mounting said support structure on said wheel.

11. The invention in accordance with claim 10,
including magnetic securing means on said support structure for connecting the same to a ferrous wheel.

12. The invention in accordance with claim 11,
one of said connector members including an arm projecting outwardly from said support structure over said wheel tread and downwardly below the same.

13. The invention in accordance with claim 12,
including adjustable locking means on said arm adapted to clamp a side of said wheel.

* * * * *